G. F. MOYERS.
VERMIN EXTERMINATING DEVICE.
APPLICATION FILED JULY 11, 1918.
1,300,997.
Patented Apr. 15, 1919.
2 SHEETS—SHEET 2.
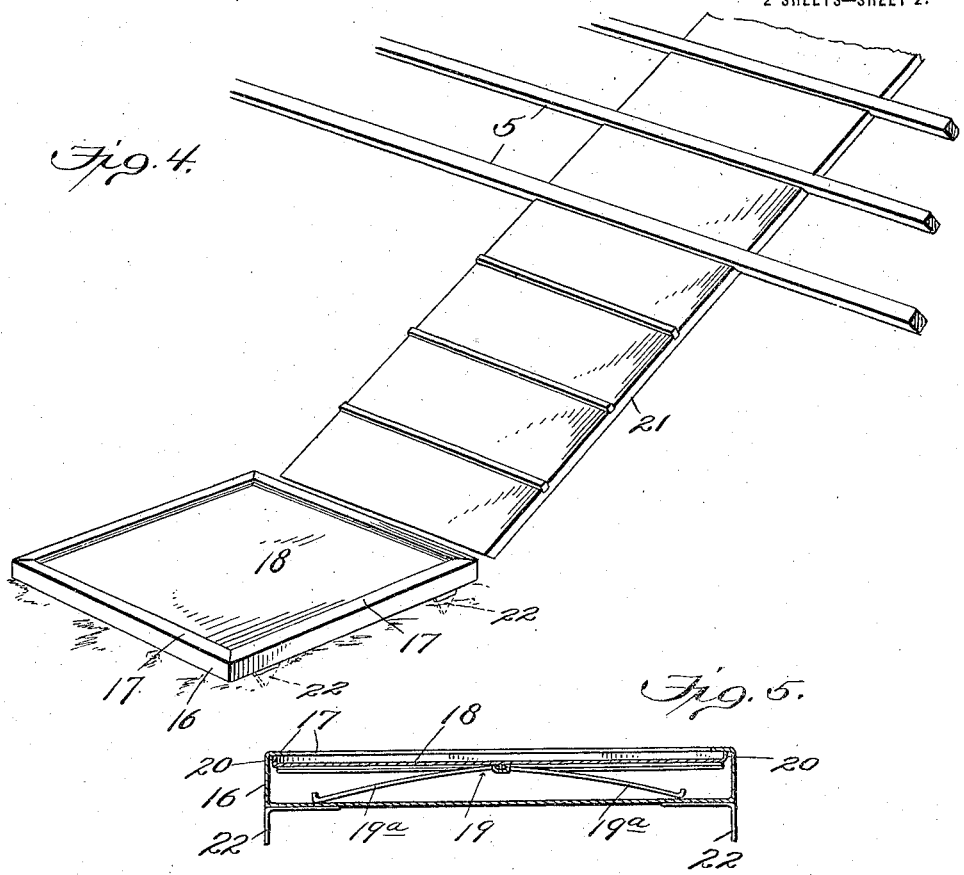
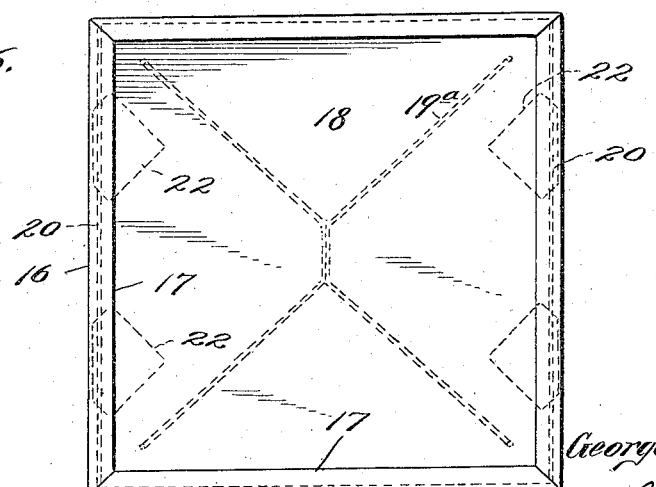
Witness
C. Kesler
Chas. S. Hyer.
Inventor
George F. Moyers
By
James L. Norris
Attorney

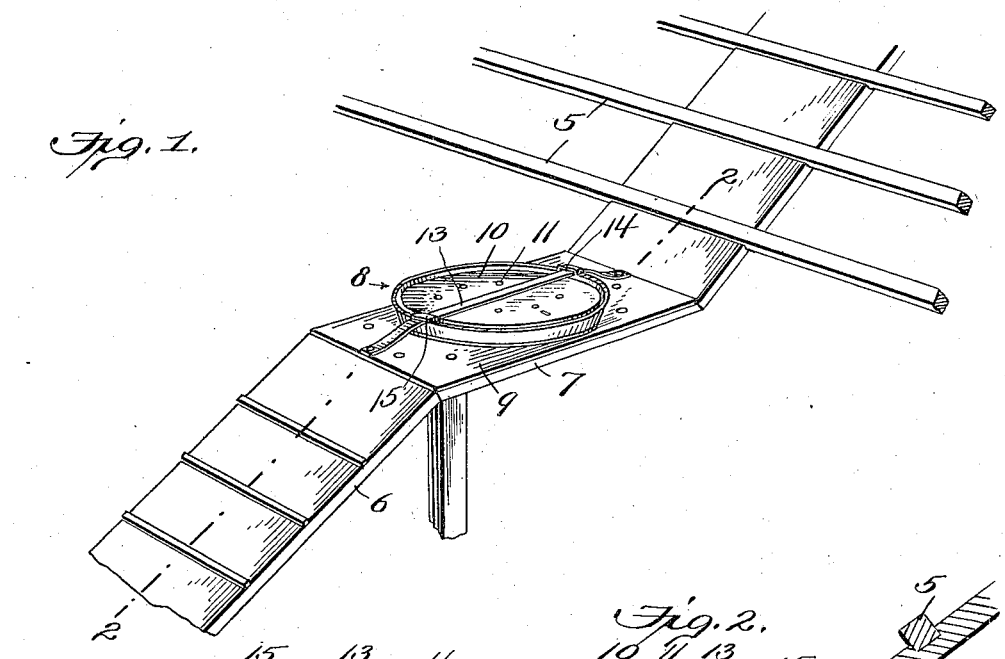
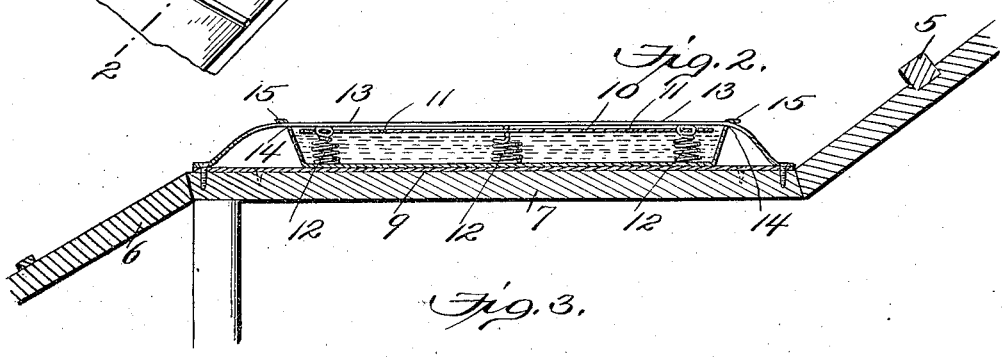
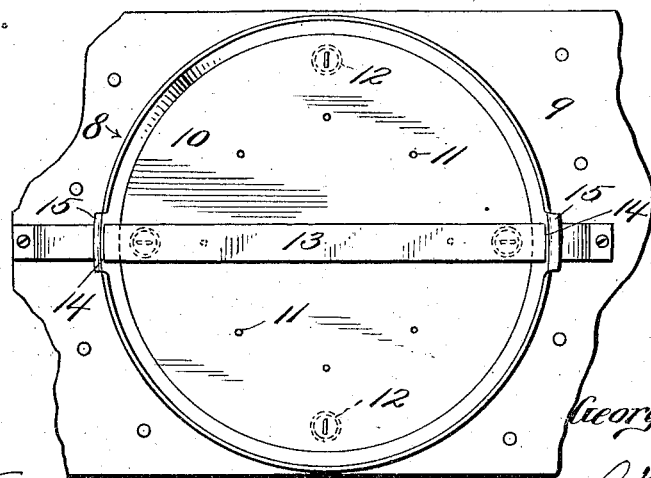

UNITED STATES PATENT OFFICE.

GEORGE F. MOYERS, OF OSCEOLA, IOWA.

VERMIN-EXTERMINATING DEVICE.

1,300,997.   Specification of Letters Patent.   Patented Apr. 15, 1919.

Application filed July 11, 1918. Serial No. 244,404.

*To all whom it may concern:*

Be it known that I, GEORGE F. MOYERS, a citizen of the United States, residing at Osceola, in the county of Clarke and State of Iowa, have invented new and useful Improvements in Vermin-Exterminating Devices, of which the following is a specification.

This invention relates to a vermin exterminator for use in connection with chicken roosts and the like, and the main object of the invention is to provide a device disposed in such position that chickens or fowls going to the roosting perches will be forced to walk over or tread upon a movable part or applicator of a receptacle whereby oil, grease or other exterminating liquid will be thoroughly applied to the feet of the fowls and conveyed to and deposited on the perches to rid the latter and the fowls of vermin, the application of the oil to the fowls' feet also serving to keep the latter clean and in a healthy condition by freeing them of scales, infection and disease. A further object of the invention is to provide a simple and effective vermin exterminating device that may be easily applied in operative position.

In the drawing:

Figure 1 represents a perspective view of a portion of a runway and roosting perches for fowls and showing the improved exterminating device applied in operative position.

Fig. 2 represents a longitudinal vertical section taken in the plane of the line 2—2, Fig. 1.

Fig. 3 is a top plan view of the improved exterminating device including a portion of the base thereof.

Fig. 4 is a view similar to Fig. 1, showing a modified form of the improved exterminating device applied in a different position.

Fig. 5 is a transverse vertical section of the exterminating device shown by Fig. 4 on a larger scale.

Fig. 6 is a top plan view of the exterminating device as shown by Figs. 4 and 5.

Referring to Figs. 1, 2 and 3, the numeral 5 designates perches having the usual inclined superposed arrangement, and leading thereto is a runway 6 which, in the present instance, has an intermediate horizontal platform 7. The roost elements, as shown, and above referred to, have been adopted to illustrate one preferred arrangement, but it should be understood that the invention is not limited to the precise roost structure explained as it may be operatively disposed in relation to other roost organizations with equal efficiency in service.

The improved exterminating device preferably comprises a comparatively shallow metal pan or receptacle 8 secured to a wood base or attaching board 9 which is attached by suitable fastenings to the platform 7 or other support therefor. Within the pan or receptacle 8 is a tread plate, disk or applicator 10 of less diameter than the said pan or receptacle and having a series of perforations 11 therein. The upper ends of a series of springs 12 are secured to the tread plate, disk or applicator 10, the lower ends of the said springs loosely bearing upon the bottom of the pan or receptacle 8. The springs 12 hold the plate, disk or applicator 10 in yielding elevated position and in a horizontal plane, and to prevent accidental disengagement of the said plate, disk or applicator from the pan or receptacle 8, a metallic retention strap 13 extends diametrically over the plate, disk or applicator and through opposite slots 14 in the pan or receptacle. The strap 13 is long enough to permit the opposite extremities to be drawn down and secured to the base 9, the said strap being yieldably mounted over the plate, disk or applicator 10 and shielded where it comes through the slots 14 by outwardly projecting horizontal lips or guards 15 at opposite portions of the upper edge of the rim of the pan or receptacle 8. These lips or guards provide for unrestricted movement of the strap 13 and avoid bending the strap closely down against or adjacent to the outer side of the rim of the pan or receptacle by the fowls treading thereupon.

One application of the improved exterminating device in operative position is shown, for example, by Fig. 1, the base or attaching board 9 carrying the pan or receptacle 8 being secured on the platform 7. Prior to mounting the strap 13 in the slots 14, the tread plate, disk or applicator 10 with the springs 12 is raised from the pan or receptacle 8 and the latter is supplied with exterminating oil or grease which will be preferably lard oil or other oil or liquid that is not injurious to the fowls and which is a good exterminator and foot preserver. The tread plate, disk or applicator 10 is then placed in operative position in the pan or receptacle 8 and will preferably rest on the top surface of the charge of oil or grease. The retention strap 13 is then inserted through the slots 14 and the ends thereof secured as shown and as hereinbefore explained. The form of the exterminating device shown by Figs. 1, 2 and 3 applied as just explained will be ready for use or to perform its function in an automatic manner. It will be seen that the pan or receptacle 8 and the base or attaching board 9 preferably have such width as to fit over and cover the platform 7 so as to force the fowls to walk over the improved device and engage the tread plate, disk or applicator 10. It is preferred that the perches 5 be preliminarily oiled to render the improved exterminating device effective and, in addition, the perches are further kept well oiled by the oil or grease adhering to the feet of the fowls, and as a consequence vermin will be rapidly exterminated and the perches will be maintained in a good condition for roosting purposes.

The modified form of the exterminator as shown by Figs. 4, 5 and 6 is essentially the same in structure as the first described form, the shallow pan or receptacle 16 being shown as square in contour but capable of production in other shapes. In this modification, the retention strap 13, the slots 14, and lips or guards 15 are eliminated, the pan or receptacle having an inwardly bent marginal flange 17 which holds the tread plate or applicator 18 in operative association with the pan or receptacle and against accidental displacement. The plate or applicator 18 in the modified structure is loose in its mounting and sustained in resilient depressible position by springs 19 which are of U-shape and have arms 19ᵃ bent downwardly and loosely bearing on the bottom of the pan or receptacle. The bowed portions of these springs 19 are adjacently secured at the center of the under side of the tread plate or applicator 18. Two of the sides of the plate or applicator 18 have upwardly projecting stop flanges 20 which maintain the plate in sensitively movable position by preventing it from engaging and adhering to the different portions of the flange 17, and also providing for unobstructed flow of the oil or material over the plate. The plate or applicator 18 is also imperforate, the oil, grease or other material being forced upwardly around the edges under the marginal flange 17 and over the top surface of the plate. The exterminator as shown by Fig. 4 is placed on the ground at the foot of the runway 21, the latter in this instance being formed without the intermediate platform 7. The exterminator in either of its forms may be disposed as found desirable to obtain the best advantage in the performance of its function. In the form of the exterminator shown by Figs. 4, 5 and 6, the bottom of the pan or receptacle is provided with holding spurs 22 which are adapted to be embedded in the ground or may be secured to any supporting means for the device. Both forms of the device are provided with retention means for the plate, disk or applicator 10 or 18, the strap 13 in the first form, and the marginal flanges 17 in the second form, and the essential features in both forms of the device are practically the same.

A further advantage of the improved oiling or exterminating device and the application of the oil to the perches is that the feet of the fowls are kept in a healthy condition, and by depositing the oil through the medium of the feet of the fowls on the perches, the droppings of the fowls in falling upon the perches will remain soft and will not adhere to the perches, said droppings gradually falling from the perches to the floor or ground below. When the tread plate, disk or applicator 10 or 18 is engaged by the fowls successively walking thereover, it will be depressed and the oil or grease will be forced upwardly through the openings 11 in the plate, disk or applicator 10 and around the edges of the similar device 18 in the modified structure onto the feet of the fowls, and when the said tread plate, disk or applicator in either instance is relieved of the weight of a fowl thereon, it will immediately return to its normal position through the action of the springs thereunder. The improved device provides for a thorough application of oil or grease to the feet of the fowls without undue waste or loss of the oil or grease. It will be understood that the several parts of the improved exterminating device may be enlarged or that the proportions or dimensions thereof varied as may be desired to adapt the same to different applications.

I claim as my invention:

1. In a vermin exterminating device of the class specified, a receptacle and a thin sheet metal plate forming a tread device and sole top closure for the receptacle and having springs interposed between the lower side thereof and the bottom of the receptacle and simultaneously removable and replaceable with the tread device when the latter is withdrawn from or inserted in the receptacle, the springs holding the plate up adjacent to the top edge of the receptacle, the receptacle being fully open at the top at all times, and means extending over a portion of the top surface of and holding the thin sheet metal plate against displacement from the receptacle and resisting the upward pressure of the springs engaging the plate and whereby the greater portion of the upper surface of the plate is continually exposed for engagement by the feet of fowls, the receptacle having a charge of exterminating material therein between the bottom thereof and the said plate and fed to the top surface of the plate by the depression of the latter.

2. In a device of the class specified, a receptacle to receive a charge of exterminating material and provided with means for securing it in applied position, the receptacle having slots at diametrically opposite portions of the top edge, a tread device loosely and yieldably mounted in the receptacle over the exterminating material and depressible in the said receptacle, said tread device being held up close to the upper edge of the receptacle and forming the sole closure for the latter, and a retention strap loosely inserted through said slots of the receptacle and secured at its ends.

3. In a device of the class specified, a receptacle for holding a charge of exterminating material having slots at diametrically opposite portions of the top edge thereof with guards extending outwardly adjacent to said slots, a depressible tread device loosely and yieldably supported within the receptacle over the exterminating material, and a retention strap loosely and removably inserted through the slots of the receptacle under the guards and adapted to be secured at its opposite ends at a distance from the receptacle.

4. In a device of the class specified, a receptacle for receiving a charge of exterminating material, a tread device mounted in the receptacle and provided with a series of openings therethrough and also with springs secured to the lower sides thereof and loosely engaging the bottom of the receptacle, and a retention strap loosely extending through the receptacle over the tread device and adapted to be secured at its ends at a distance from the receptacle.

In testimony whereof I have hereunto set my hand in presence of two subscribing witnesses.

GEORGE F. MOYERS.

Witnesses:
W. B. TALLMAN, Jr.,
W. H. TOTTEN.

Copies of this patent may be obtained for five cents each, by addressing the "Commissioner of Patents, Washington, D. C."